(12) United States Patent  
Decesaris et al.

(10) Patent No.: US 9,239,809 B2  
(45) Date of Patent: Jan. 19, 2016

(54) MESSAGE BROADCAST IN A 1-WIRE SYSTEM

(71) Applicant: Lenovo Enterprise Solutions (Singapore) Pte. Ltd., Singapore (SG)

(72) Inventors: Michael Decesaris, Carrboro, NC (US); James J. Parsonese, Cary, NC (US); Luke D. Remis, Raleigh, NC (US); Kevin S. D. Vernon, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 364 days.

(21) Appl. No.: 13/939,371

(22) Filed: Jul. 11, 2013

(65) Prior Publication Data

US 2015/0019782 A1  Jan. 15, 2015

(51) Int. Cl.
*G06F 13/00* (2006.01)
*G06F 13/40* (2006.01)
*G06F 3/00* (2006.01)

(52) U.S. Cl.
CPC .................................. *G06F 13/4068* (2013.01)

(58) Field of Classification Search
None
See application file for complete search history.

(56) References Cited

U.S. PATENT DOCUMENTS

| 7,574,544 | B1 | 8/2009 | Nekl |
| 7,720,089 | B2 | 5/2010 | Kadowaki |
| 7,729,427 | B2 | 6/2010 | Kwok |
| 7,921,320 | B2 | 4/2011 | D'Angelo et al. |
| 2006/0242348 | A1* | 10/2006 | Humphrey et al. ........... 710/305 |
| 2008/0159432 | A1 | 7/2008 | Ng |
| 2009/0024764 | A1* | 1/2009 | Atherton et al. .............. 709/250 |

FOREIGN PATENT DOCUMENTS

EP    2400398 B1    12/2012

OTHER PUBLICATIONS

Anonymous, "1-Wire", Wikipedia.org, Retrieved May 7, 2013, pp. 1, <http://en.wikipedia.org/wiki/1-Wire>.
B. Linke, "Overview of 1-Wire Technology and Its Use", Maxim Integrated, Jun. 19, 2008, pp. 1-13.

* cited by examiner

*Primary Examiner* — Henry Tsai
*Assistant Examiner* — Dean Phan
(74) *Attorney, Agent, or Firm* — Law Office of Jim Boice

(57) ABSTRACT

A message is simultaneously broadcast to multiple systems on a 1-wire bus. A first addressed communication session is established between a microprocessor and a first 1-wire I/O expander via a 1-wire bus, where the first 1-wire I/O expander is electrically coupled to a first system. The first 1-wire I/O expander is placed into "fast access mode", and then removed from the 1-wire bus by opening a switch to the 1-wire bus. A second addressed communication session is established between the microprocessor and a second 1-wire I/O expander before the switch recloses, where the second 1-wire I/O expander is electrically coupled to a second system. The second 1-wire I/O expander is then placed into "fast access mode". In response to the timer expiring and the switch reclosing, an unaddressed message is broadcast from the microprocessor to the first and second systems via the first and second 1-wire I/O expanders.

7 Claims, 3 Drawing Sheets

MESSAGE BROADCAST IN A 1-WIRE SYSTEM

BACKGROUND

The present disclosure relates to the field of electronic circuits, and specifically to 1-wire electronic circuits. Still more particularly, the present disclosure relates to broadcasting a message to multiple systems on a 1-wire electronic circuit.

A 1-wire system is a communications bus system that provides low-speed communication to devices on a single data wire. Although a 1-wire bus actually has two wires, one for data and one for ground, there is only one wire for data, and thus the name "1-wire". A 1-wire system, due to its low speed, is used for simple functions, such as identifying a system on a 1-wire bus, providing rudimentary control signals, transmitting temperature and date readings, transmitting periodical logging readings, etc.

SUMMARY

In one embodiment of the present invention, a modified 1-wire system comprises a microprocessor electrically coupled to a 1-wire bus, wherein the 1-wire bus has only a single data wire and a single ground wire, and wherein the 1-wire bus is initially configured to allow the microprocessor to address only one system at a time via the 1-wire bus. A first 1-wire I/O expander electrically couples a first system to an electrical switch, wherein the electrical switch selectively couples the first 1-wire I/O expander to the 1-wire bus, wherein the electrical switch is controlled by a timer, and wherein the timer is controlled by an output of the first 1-wire I/O expander. A second 1-wire I/O expander electrically couples a second system to the 1-wire bus.

In one embodiment of the present invention, a system includes a modified 1-wire system that comprises a microprocessor electrically coupled to a 1-wire bus, wherein the 1-wire bus has only a single data wire and a single ground wire, and wherein the 1-wire bus is initially configured to allow the microprocessor to address only one system at a time via the 1-wire bus. A first 1-wire I/O expander electrically couples a first system to an electrical switch, wherein the electrical switch selectively couples the first 1-wire I/O expander to the 1-wire bus, wherein the electrical switch is controlled by a timer, and wherein the timer is controlled by an output of the first 1-wire I/O expander. A second 1-wire I/O expander electrically couples a second system to the 1-wire bus.

In one embodiment of the present invention, a method to simultaneously broadcast a message to multiple systems via a 1-wire bus is presented. A first addressed communication session is established between a microprocessor and a first 1-wire I/O expander via a 1-wire bus, wherein the first 1-wire I/O expander is electrically coupled to a first system. The first 1-wire I/O expander is placed into "fast access mode", and then removed from the 1-wire bus by opening a switch between the first 1-wire I/O expander and the 1-wire bus, wherein the switch is opened by starting a timer whose output is coupled to the switch. A second addressed communication session is established between the microprocessor and a second 1-wire I/O expander before the timer expires and the switch recloses, where the second 1-wire I/O expander is electrically coupled to a second system. The second 1-wire I/O expander is then placed into "fast access mode". In response to the timer expiring and the switch reclosing, an unaddressed message is broadcast from the microprocessor to the first system and second system via the first 1-wire I/O expander and the second 1-wire I/O expander.

DETAILED DESCRIPTION

Figure 1:
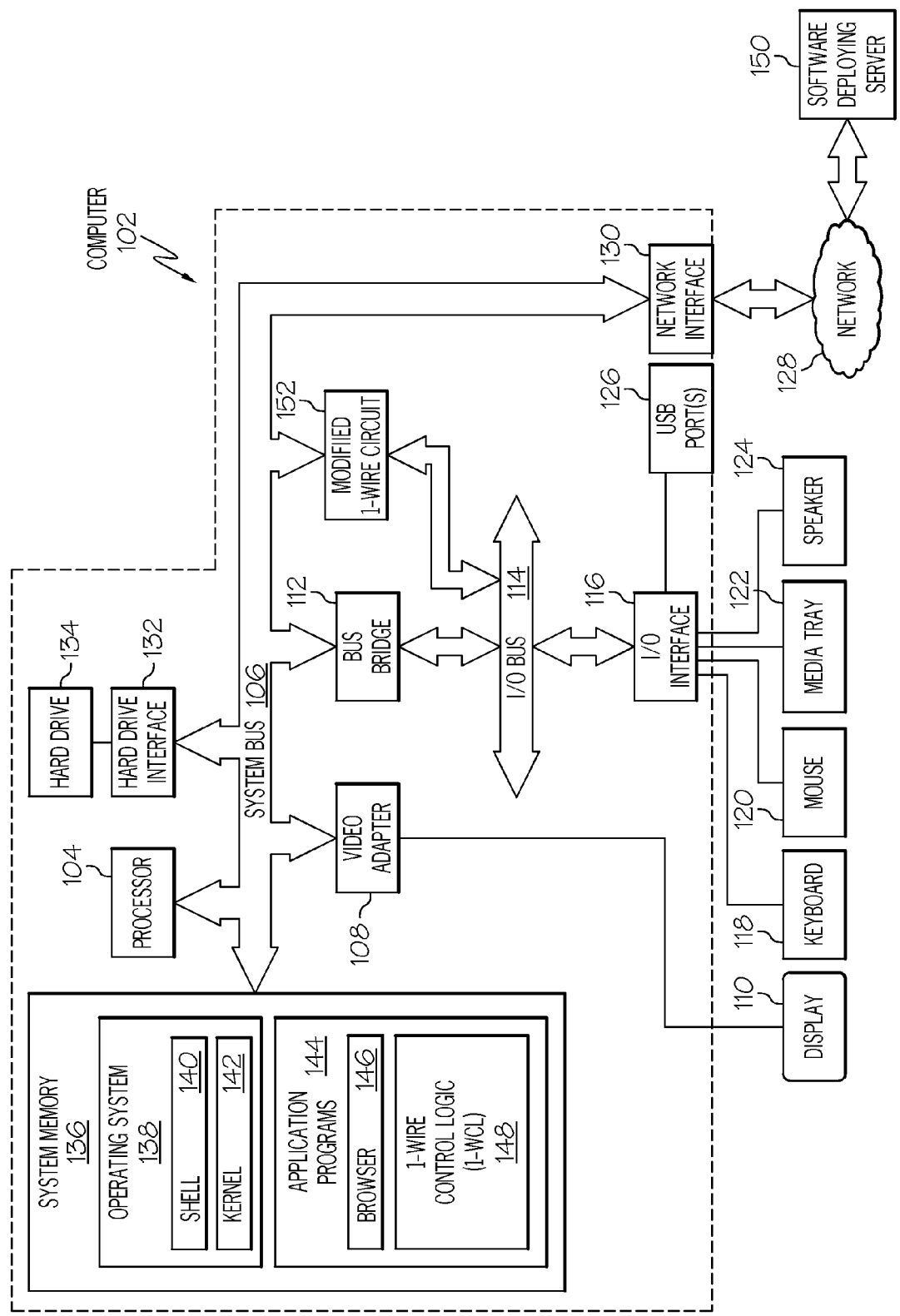
FIG. 1 depicts an exemplary system and network in which the present invention may be implemented and/or utilized.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and/or other computer systems.

Application programs 144 in computer 102's system memory (as well as software deploying server 150's system memory) also include a 1-wire control logic (1-WCL) 148. The 1-WCL 148 includes code for implementing the processes described below, including those described in FIGS. 2-3, and/or controlling operations within a 1-wire circuit 152. In one embodiment, computer 102 is able to download 1-WCL 148 from software deploying server 150, including in an on-demand basis, wherein the code in 1-WCL 148 is not downloaded until needed for execution. Note further that, in one embodiment of the present invention, software deploying server 150 performs all of the functions associated with the present invention (including execution of 1-WCL 148), thus freeing computer 102 from having to use its own internal computing resources to execute 1-WCL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

One inherent trait of a 1-wire system is that only one device can be logically connected to the 1-wire bus at a time, thus ensuring electrostatic discharge (ESD) protection to all but a currently-coupled device. However, this also results in the inability to broadcast a single message to multiple devices on the 1-wire bus at the same time. The presently described invention overcomes this limitation of the prior art.

Figure 2:
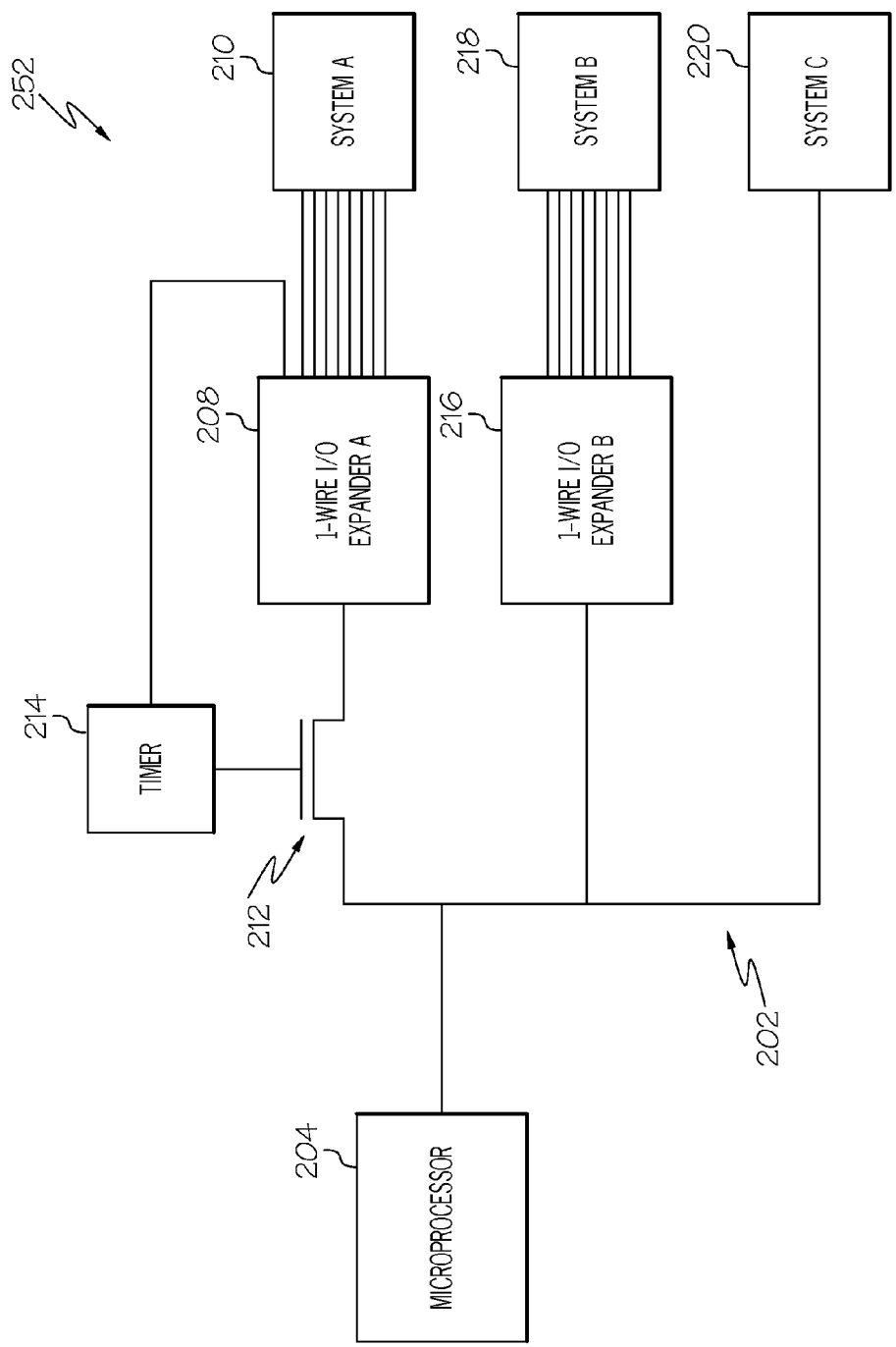
FIG. 2 depicts an exemplary 1-wire system that has been modified to enable the broadcast of a single message to multiple systems via a single 1-wire bus.

With reference now to FIG. 2, an exemplary modified 1-wire circuit 252 is depicted. Modified 1-wire circuit 252 may be within a computer system, such as modified 1-wire circuit 152 depicted in FIG. 1, or modified 1-wire circuit 252 may be a part of any other electronic system, or modified 1-wire circuit 252 may be a stand-alone system.

As depicted, modified 1-wire circuit 252 includes a 1-wire bus 202 that is electrically coupled to a microprocessor 204. The 1-wire bus 202 has only a single data wire (not depicted) and a single ground wire (not depicted). As the 1-wire bus 202 is a 1-wire device, it is initially configured to allow the microprocessor 204 to address only one system at a time via the 1-wire bus 202. That is, a 1-wire system is defined as a system that, if unmodified, only permits communication to a single address at a time. Thus, if there are two devices coupled to a 1-wire bus, the 1-wire bus is only capable of addressing one device at a time. However, the present invention utilizes I/O expanders and "fast access mode" to overcome this limitation of the prior art. Such simultaneous broadcasts allow multiple devices to be synchronized by a same/single instruction, receive time-sensitive alerts/messages, etc.

Thus, as depicted in the exemplary modified 1-wire circuit 252 in FIG. 2, a first 1-wire input/output (I/O) expander A (208) electrically couples a first system A (210) to an electrical switch 212. In the example shown, electrical switch 212 is a field-effect transistor (FET). The electrical switch 212 selectively couples the first 1-wire I/O expander A (208) to the 1-wire bus 202. As depicted, the electrical switch 212 is controlled by a timer 214, which may be a capacitor, a digital timer, etc. The timer 214 is controlled by an output of the first 1-wire I/O expander A (208). In one embodiment, this output is initiated in response to the microprocessor 204 placing the first 1-wire I/O expander A (208) into "fast access mode" by the microprocessor 204 sending a "fast access mode" control signal to the first 1-wire I/O expander A (208).

The 1-wire I/O expanders A-B depicted in FIG. 2 are devices that enable Systems A-B to communicate with microprocessor 204 without being addressed. That is, each 1-wire I/O expander establishes a hard connection with a particular 1-wire system, which ordinarily (under the 1-wire protocol) must be addressed to receive a message from the microprocessor 204. However, the 1-wire I/O expanders A-B allow the systems A-B to receive unaddressed messages from the microprocessor 204, since the 1-wire I/O expanders A-B (while in "fast access mode") are able to receive unaddressed messages that are placed on the 1-wire bus 202 by the microprocessor 204.

"Fast access mode" is defined as a mode of operation for a 1-wire I/O expander that allows the 1-wire I/O expander to receive an unaddressed message. That is, in normal operations, devices that are coupled to a 1-wire bus receive messages that are sent to their specific addresses, which may be a physical address (e.g., a media access control (MAC) address), a universally unique identifier (UUID) address, etc. However, in "fast access mode", a device keeps its I/O input port open, such that any message/signal (addressed, unaddressed, or otherwise) on the 1-wire bus is received/accepted by the device that is in "fast access mode".

As depicted, a second 1-wire I/O expander B (216) electrically couples a second system B (218) directly to the 1-wire bus 202. Thus, according to one embodiment of the present invention, the first 1-wire I/O expander A (208) is placed into "fast access mode" after establishing a first addressed connection with the microprocessor. This first addressed connection establishes a connection between the microprocessor 204 and an address that is specific for the first 1-wire I/O expander A (208). Thereafter, the first 1-wire I/O expander A (208) is decoupled from the 1-wire bus 202 by the electrical switch 212 for a period of time that is controlled by the timer 214. That is, as long as the period of time has not expired, the timer 214 keeps the electrical switch 212 open, such that the 1-wire I/O expander A (208) is uncoupled from the 1-wire bus 202.

While the 1-wire I/O expander A (208) is uncoupled from the 1-wire bus 202, the microprocessor 204 establishes a second address connection with the second 1-wire I/O expander B (216) before the period of time expires. This second addressed connection establishes a connection between the microprocessor 204 and another address, which is unique to/for the second 1-wire I/O expander B (216). Upon establishing this connection, the microprocessor 204 places the second 1-wire I/O expander B (216) in "fast access mode". At this point, both the first 1-wire I/O expander B (208) and the second 1-wire I/O expander B (216) are in "fast access mode".

The first 1-wire I/O expander A (208) is then recoupled to the 1-wire bus 202 upon the period of time elapsing. That is, once the time that the timer 214 is counting down ends, the timer 214 sends a control signal to the electrical switch 212 to reclose, thus recoupling the 1-wire I/O expander A (208), which is now in "fast access mode", to the 1-wire bus 202. As both the first 1-wire I/O expander A (208) and the second 1-wire I/O expander B (216) are now 1) in "fast access mode" and 2) coupled to the microprocessor 204 via the 1-wire bus 202, the microprocessor can broadcast a single unaddressed message (i.e., a message that is not addressed to any entity, but rather is simply put on the 1-wire bus 202), which will be simultaneously received by both the first 1-wire I/O expander A (208) and the second 1-wire I/O expander B (216). Since the first 1-wire I/O expander A (208) is directly coupled to the first system A (210) and the second 1-wire I/O expander B (216) is directly coupled to the second system B (218), the first system A (210) and the second system B (218) will simultaneously receive the unaddressed message from the microprocessor 204.

As depicted in FIG. 2, in one embodiment there is also a third system C (220), which is also configured as a 1-wire device. Note that third system C (220) is directly coupled to the 1-wire bus 202. However, since the third system C (220) is configured as a 1-wire device, it is unable to receive the unaddressed message from the microprocessor 202. That is, when the microprocessor 202 puts the unaddressed message on the 1-wire bus 202, third system C (220) will simply ignore this unaddressed message, since it is unaddressed to third system C (220), or any other device. Thus, only the first system A (210) and the second system B (218) will simultaneously receive the unaddressed message from the microprocessor 204 via their respective first 1-wire I/O expander A (208) and second 1-wire I/O expander B (216).

Note that systems A-C may be any electronic circuit, device, etc. In one embodiment, systems A-C are processors, while in another embodiment they are client computers. Again, however, these examples are not to be construed as limiting what types of devices/circuits may be represented by systems A-C in FIG. 2. Whatever the structure of systems A-B, note that the present invention allows them to receive the unaddressed message simultaneously from microprocessor 204. For example, in one embodiment the microprocessor 204 is a management processor that controls the activities and states of systems A-C. By being able to simultaneously broadcast the unaddressed message to systems A-B (210, 218) as described herein, systems A-B (210, 218) can be synchronized. That is, assume that the unaddressed message is a reset signal. Through the use of the present invention as described herein, both systems A-B (210, 218) can be reset at exactly the same time, thus synchronizing their states, actions, etc.

Note that FIG. 2 depicts only two 1-wire I/O expanders (208, 216) and two systems (210, 218). However, it is understood that multiple (i.e., more than two) 1-wire I/O expanders, and their associated systems (e.g., 210, 218) may be utilized by the present invention, assuming that all but one of the multiple 1-wire I/O expanders has its own FET/switch (e.g., 212). That is, if there are "n" 1-wire I/O expanders, each of which is coupled to one of "n" systems, then the modified 1-wire system 252 requires "n−1" switches/FETs, such that all but one of the 1-wire I/O expanders has a switch/FET dedicated to it.

Note further that the present invention/process allows one or more 1-wire I/O expanders to be selectively placed into "fast access mode" while other 1-wire I/O expanders are not placed into "fast access mode". For example, assume that the modified 1-wire system 252 shown in FIG. 2 also has a third 1-wire I/O expander X (not shown), which is connected to a system X. If 1-wire I/O expander A and 1-wire I/O expander B are placed into "fast access mode" (as described above), but 1-wire I/O expander X is not placed into "fast access mode", then only systems A-B (210, 218) would receive the unaddressed signal/message from microprocessor 204, but system X would not receive this unaddressed signal/message from microprocessor 204.

Figure 3:
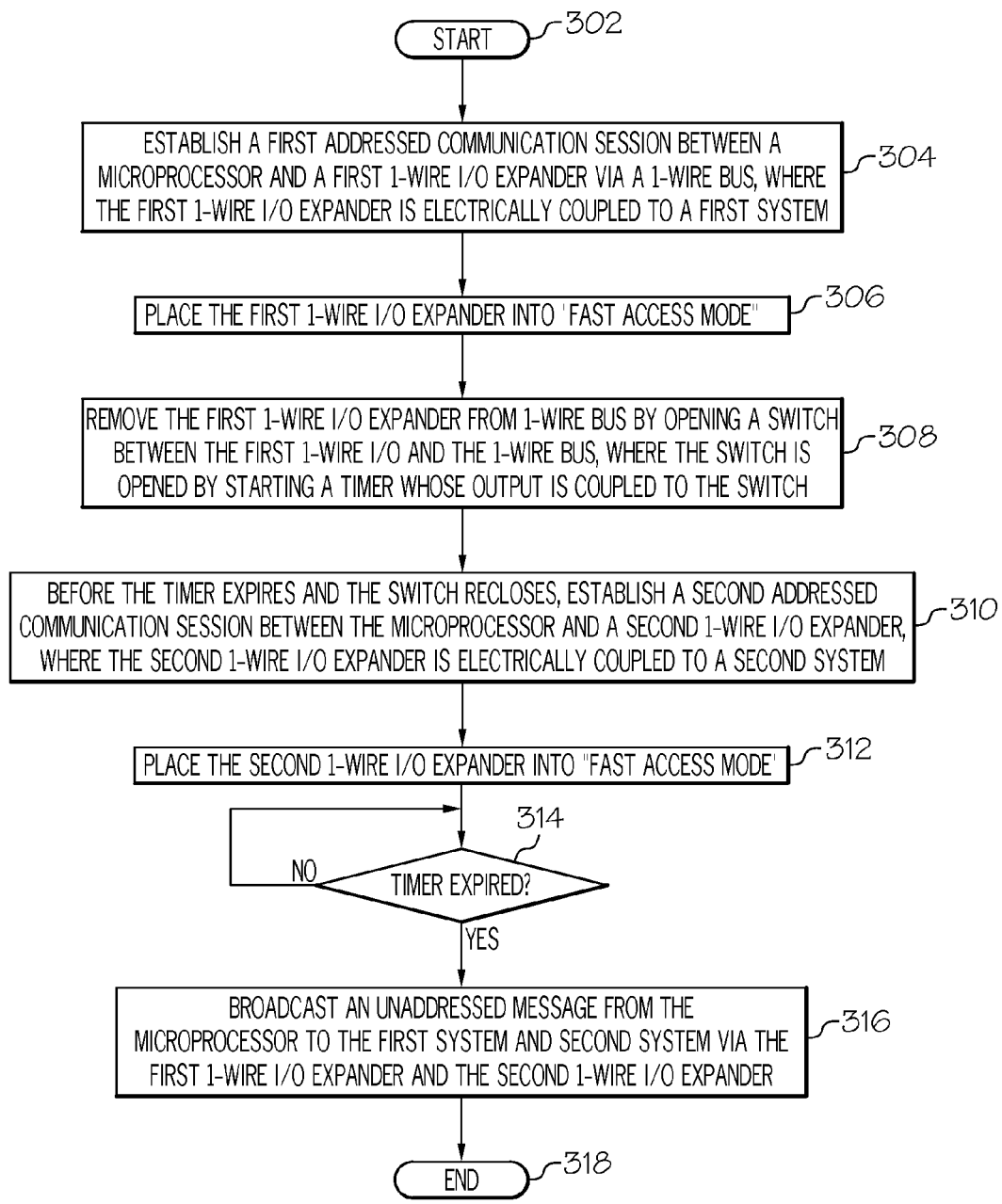
FIG. 3 is a high level flow chart of one or more exemplary steps taken by hardware to broadcast a single message to multiple systems via a single 1-wire bus.

With reference now to FIG. 3, a high-level flow chart of steps taken by hardware to broadcast a message simultaneously to multiple systems via a 1-wire bus is presented. After initiator block 302, a first addressed communication session is established between a microprocessor and a first 1-wire I/O expander via a 1-wire bus (block 304). As described in detail in FIG. 2, the first 1-wire I/O expander is electrically coupled to a first system.

As described in block 306, the first 1-wire I/O expander is then placed into "fast access mode". Upon being placed into "fast access mode", the first 1-wire I/O expander is removed from (i.e., decoupled from) the 1-wire bus by opening a switch between the first 1-wire I/O expander and the 1-wire bus, where the switch is opened by starting a timer whose output is coupled to the switch (block 308).

As descried in block 310, a second addressed communication session between the microprocessor and a second 1-wire I/O expander (which is electrically coupled to a second system) is established before the timer expires and the switch recloses. The second 1-wire I/O expander is then placed into "fast access mode" (block 312).

A query is then made to determine if the timer, which controls the switch that couples the first 1-wire I/O expander to the 1-wire bus, has expired (i.e., the time that is being counted down by the timer has reached its end), as depicted in query block 314. If so (i.e., in response to the timer expiring and the switch reclosing), then an unaddressed message is broadcast from the microprocessor to the first system and second system via the first 1-wire I/O expander and the second 1-wire I/O expander (block 316). The process ends at terminator block 318.

Note that, in one embodiment, the timer is controlled by a timer output from the first 1-wire I/O expander. In one embodiment, this timer output is initiated in response to the first 1-wire I/O expander being placed into "fast access mode".

Note further that, in one embodiment, a third system is electrically coupled directly to the 1-wire bus. This third system is configured as a 1-wire device, and thus is unable to receive the unaddressed message that is broadcast from the microprocessor.

Note that after the broadcast message is sent to all of the 1-wire I/O expanders that are in "fast access mode", as described herein, these same 1-wire I/O expanders can be returned to their initial 1-wire configuration (i.e., not in "fast access mode"), such that they must once again be addressed in order to receive a message/alert/etc. In one embodiment, returning these 1-wire I/O expanders is accomplished by sending a message to the 1-wire I/O expanders to disconnect from the 1-wire bus, thus resetting them to return to their initial/normal "address" mode.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A modified 1-wire circuit comprising:
   a microprocessor electrically coupled to a 1-wire bus, wherein the 1-wire bus has only a single data wire and a single ground wire, and wherein the 1-wire bus is initially configured to allow the microprocessor to address only one system at a time via the 1-wire bus;
   a first -wire input/output (I/O) expander, wherein the first 1-wire I/O expander electrically couples a first system to an electrical switch, wherein the electrical switch selectively couples the first 1-wire I/O expander to the 1-wire bus, wherein the electrical switch is controlled by a timer, and wherein the timer is controlled by an output of the first 1-wire I/O expander; and
   a second 1-wire I/O expander, wherein the second 1-wire I/O expander electrically couples a second system to the 1-wire bus, wherein:
      the first 1-wire I/O expander is placed into fast access mode after the microprocessor establishes a first addressed connection with the first 1-wire I/O expander, wherein the first addressed connection establishes a connection between the microprocessor and an address of the first 1-wire I/O expander and wherein the fast access mode enables a 1-wire device to receive an unaddressed message via a 1-wire bus;
      the first 1-wire I/O expander is decoupled from the 1-wire bus by the electrical switch for a period of time that is controlled by the timer;
      the microprocessor establishes a second address connection with the second 1-wire I/O expander before the period of time expires, wherein the second address connection establishes a connection between the microprocessor and an address of the second 1-wire I/O expander;
      the microprocessor places the second 1-wire I/O expander into the fast access mode;
      the first 1-wire I/O expander is recoupled to the 1-wire bus upon the period of time elapsing; and
      the fast access mode enables the first 1-wire I/O expander and the second 1-wire I/O expander to simultaneously receive an unaddressed message from the microprocessor.

2. The modified 1-wire circuit of claim 1, further comprising:
   a third system, wherein the third system is directly coupled to the 1-wire bus, and wherein the third system is configured as a 1-wire device and thus is unable to receive the unaddressed message from the microprocessor.

3. A method of broadcasting a message simultaneously to multiple systems via a 1-wire bus, the method comprising:
   establishing a first addressed communication session between a microprocessor and a first 1-wire I/O expander via a 1-wire bus, wherein the first 1-wire I/O expander is electrically coupled to a first system;
   placing the first 1-wire I/O expander into fast access mode;
   decoupling the first 1-wire I/O expander from the 1-wire bus by opening a switch between the first 1-wire I/O expander and the 1-wire bus, wherein the switch is opened by starting a timer whose output is coupled to the switch;
   establishing a second addressed communication session between the microprocessor and a second 1-wire I/O expander before the timer expires and the switch recloses, wherein the second 1-wire I/O expander is electrically coupled to a second system;
   placing the second 1-wire I/O expander into the fast access mode; and
   in response to the timer expiring and the switch reclosing, broadcasting an unaddressed message from the microprocessor to the first system and second system via the first 1-wire I/O expander and the second 1-wire I/O expander.

4. The method of claim 3, further comprising:
   controlling the timer by a timer output from the first 1-wire I/O expander, wherein the timer output is initiated in response to the first 1-wire I/O expander being placed into the fast access mode.

5. The method of claim 3, further comprising:
   electrically coupling a third system directly to the 1-wire bus, wherein the third system is configured as a 1-wire device, and wherein the third system is unable to receive the unaddressed message that is broadcast from the microprocessor.

6. A computer system comprising a modified 1-wire circuit, wherein the modified 1-wire circuit comprises:
   a microprocessor electrically coupled to a 1-wire bus, wherein the 1-wire bus has only a single data wire and a single ground wire, and wherein the 1-wire bus is initially configured to allow the microprocessor to address only one system at a time via the 1-wire bus;
   a first 1-wire input/output (I/O) expander, wherein the first 1-wire I/O expander electrically couples a first system to an electrical switch, wherein the electrical switch selectively couples the first 1-wire I/O expander to the 1-wire bus, wherein the electrical switch is controlled by a timer, and wherein the timer is controlled by an output of the first 1-wire I/O expander; and
   a second 1-wire I/O expander, wherein the second 1-wire I/O expander electrically couples a second system to the 1-wire bus, wherein:
      the first 1-wire I/O expander is placed into fast access mode after the microprocessor establishes a first addressed connection with the first 1-wire I/O expander, wherein the first addressed connection establishes a connection between the microprocessor and an address of the first 1-wire I/O expander;
      the first 1-wire I/O expander is decoupled from the 1-wire bus by the electrical switch for a period of time that is controlled by the timer;
      the microprocessor establishes a second address connection with the second 1-wire I/O expander before the period of time expires, wherein the second address connection establishes a connection between the microprocessor and an address of the second 1-wire I/O expander;
      the microprocessor places the second 1-wire I/O expander in the fast access mode;
      the first 1-wire I/O expander is recoupled to the 1-wire bus upon the period of time elapsing; and the fast access mode enables the first 1-wire I/O expander and the second 1-wire I/O expander to simultaneously receive an unaddressed message from the microprocessor.

7. The system of claim 6, wherein the modified 1-wire system further comprises:
a third system, wherein the third system is directly coupled to the 1-wire bus, and wherein the third system is configured as a 1-wire device and thus is unable to receive the unaddressed message from the microprocessor.

* * * * *